United States Patent [19]

Lechman

[11] Patent Number: 4,869,564
[45] Date of Patent: Sep. 26, 1989

[54] MODULAR FURNITURE

[75] Inventor: John N. Lechman, Huntingdon Valley, Pa.

[73] Assignee: Nova Office Furniture, Inc., Huntingdon Valley, Pa.

[21] Appl. No.: 235,852

[22] Filed: Aug. 24, 1988

[51] Int. Cl.[4] ............................................. A47B 17/00
[52] U.S. Cl. .................................. 312/195; 312/263; 403/407.1; 403/231; 108/111
[58] Field of Search ..................... 403/407.1, 245, 231; 312/195, 263; 108/64, 90, 111, 153

[56] References Cited

U.S. PATENT DOCUMENTS

| | | | |
|---|---|---|---|
| 3,951,558 | 4/1976 | Komarov | 312/263 |
| 4,131,376 | 12/1978 | Busse | 403/231 X |
| 4,326,760 | 4/1982 | Ziegelheim et al. | 312/263 |
| 4,439,971 | 4/1984 | Rutherford | 312/263 X |
| 4,518,278 | 5/1985 | Koch | 403/407.1 X |
| 4,599,011 | 7/1986 | Tashiro et al. | 403/407.1 X |
| 4,632,473 | 12/1986 | Smith | 403/231 X |

Primary Examiner—Joseph Falk
Attorney, Agent, or Firm—Caesar, Rivise, Bernstein, Cohen & Pokotilow

[57] ABSTRACT

Readily assemblable furniture composed of plural, precision sized, covered, panels and a module assembly. The module assembly comprises releasably secureable connector members and a precision sized, covered, support panel having an end surface. At least a first one of the plural panels is secured to the support panel by at least one pair of the connectors consisting of a plug member and a rod-like member. The plug member has a recess in its periphery and is adapted to be disposed within a respective cylindrical bore in the support panel. The rod-like member has a threaded end for securement to the first panel and a oppositely disposed end having a head for disposition within the recess in the plug member. The plug member is rotatable in a first direction about an axis extending through the bore to pull the rod-like member deeply within the recess to tightly secure the first panel to the support panel. Other panels are connected to the support panel and/or to each other utilizing other pairs of connectors.

24 Claims, 5 Drawing Sheets

MODULAR FURNITURE

BACKGROUND OF THE INVENTION

This invention relates generally to furniture and more particularly to ready-to-assemble furniture.

Various types of inexpensive, ready-to-assemble (e.g., knock-down) furniture are available commercially. While many types of such furniture do enable ready assembly, when assembled they have, unfortunately, not exhibited the appearance of factory-assembled furniture. Moreover, many prior art ready-to-assemble furniture exhibit the tendency to loosen up or come apart after extended use.

OBJECTS OF THE INVENTION

Accordingly, it is a general object of this invention to provide furniture which overcomes the disadvantages of the prior art.

It is a further object of this invention to provide furniture which is simple in construction and relatively low in cost.

It is still a further object of this invention to provide furniture which is simple in construction, can be readily assembled, yet nevertheless gives the appearance of factory assembled furniture.

It is yet a further object of this invention to provide furniture which can be readily assembled without special tools or techniques, yet which is resistant to accidental disconnection.

It is yet a further object of this invention to provide furniture which can be readily disassembled, when desired.

SUMMARY OF THE INVENTION

Furniture which is quick to assembly and which comprises a top surface and a module assembly. The module assembly comprises modular support means and releasably securable connector means. The modular support means comprises a support panel having a top end surface. The top panel of the furniture is releasably secured to the top end surface of the support panel by the connector means to support the top panel above a floor surface. The connector means comprises at least one pair of cooperating members, one being a plug member and the other a rod-like member. The plug member includes a recess in a portion of its periphery and is adapted to be located within a cylindrical bore in the support panel. The rod-like member has a first end for securement to the top panel and a second, oppositely disposed end for disposition within the recess in the plug member. The plug member is rotatable in a first rotational direction about an axis extending through the bore to lock the head within the recess and thereby secure the panels together.

DESCRIPTION OF THE DRAWING

FIG. is an exploded perspective view of the embodiment shown in FIG. 1.

DETAILED DESCRIPTION OF THE PREFERRED EMBODIMENT

Figures 1, 8, 9:
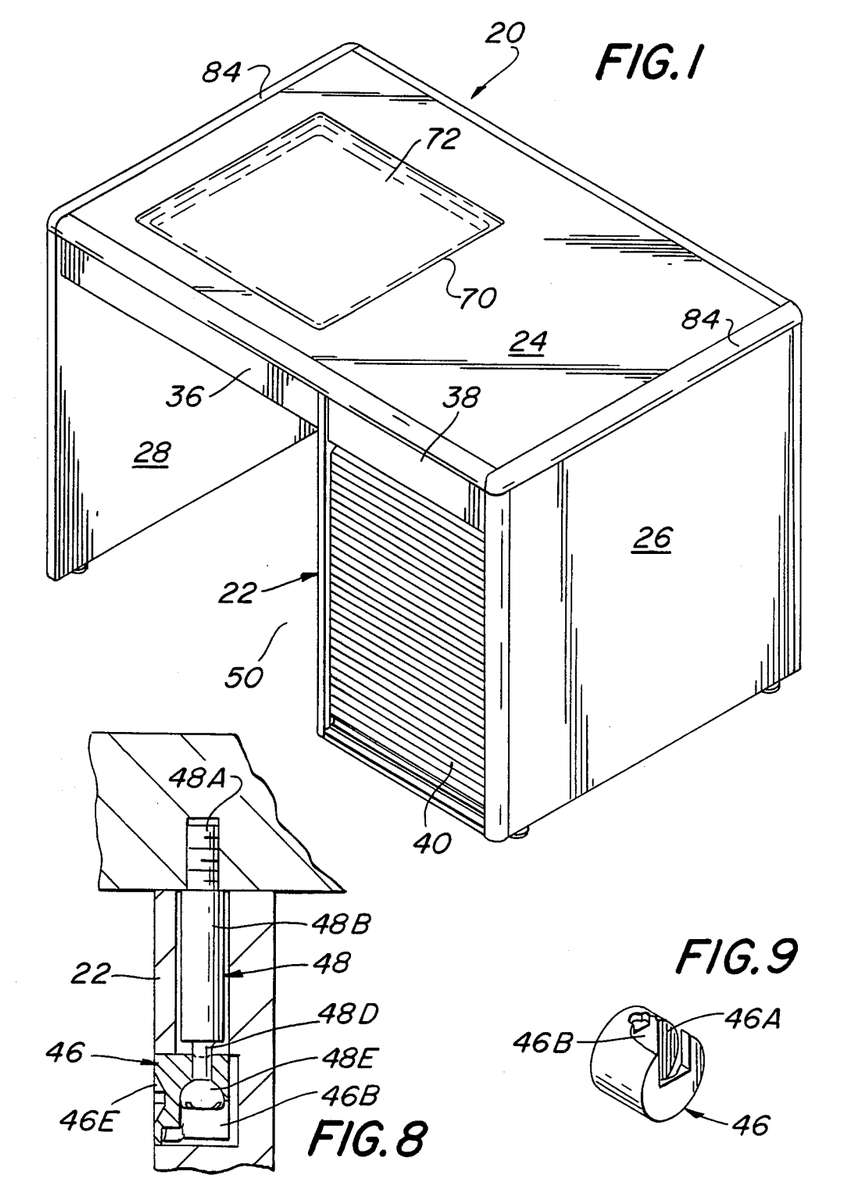
FIG. 1 is a perspective view of one embodiment of furniture constructed in accordance with this invention.
FIG. 8 a sectional view taken along line 8—8 of FIG. 7.
FIG. 9 a perspective view of a portion of one component of the plural releasably securable connectors used to assembly the embodiment of FIG. 1.

Referring now to various figures of the drawing wherein like reference characters refer to like parts there is shown at 20 in FIG. 1 a piece of furniture, i.e., a desk for a computer or a video display terminal (VDT), constructed in accordance with this invention. It must be pointed out that the VDT desk 20 shown and described herein is merely exemplary. Thus, various other types of furniture, e.g., secretarial desks, credenzas, organizers, etc., can be constructed in accordance with the teachings of this invention.

As will be appreciated by those skilled in the art from the following all pieces of furniture which are constructed in accordance with this invention can be assembled and disassembled quickly and easily without the use of special tools or techniques. Thus, in that respect the furniture of the subject invention is like some conventional knock-down furniture. However, what sets the furniture of the subject invention apart from prior art knock-down furniture is that once assembled it doesn't have the cheap home-assembled appearance of the prior art furniture. Instead the furniture of this invention has the appearance of fine, factory-assembled furniture.

Figure 2:
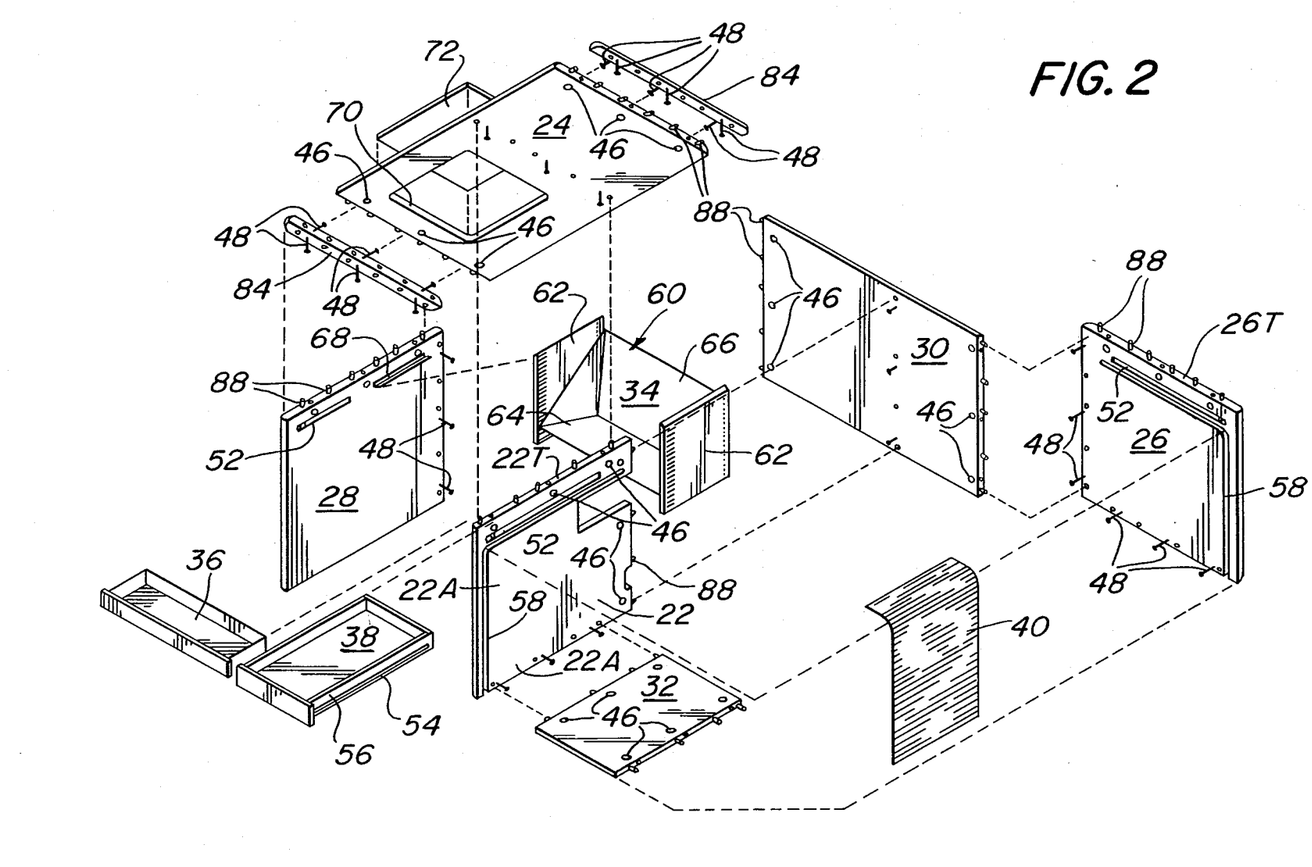
Figure 3:
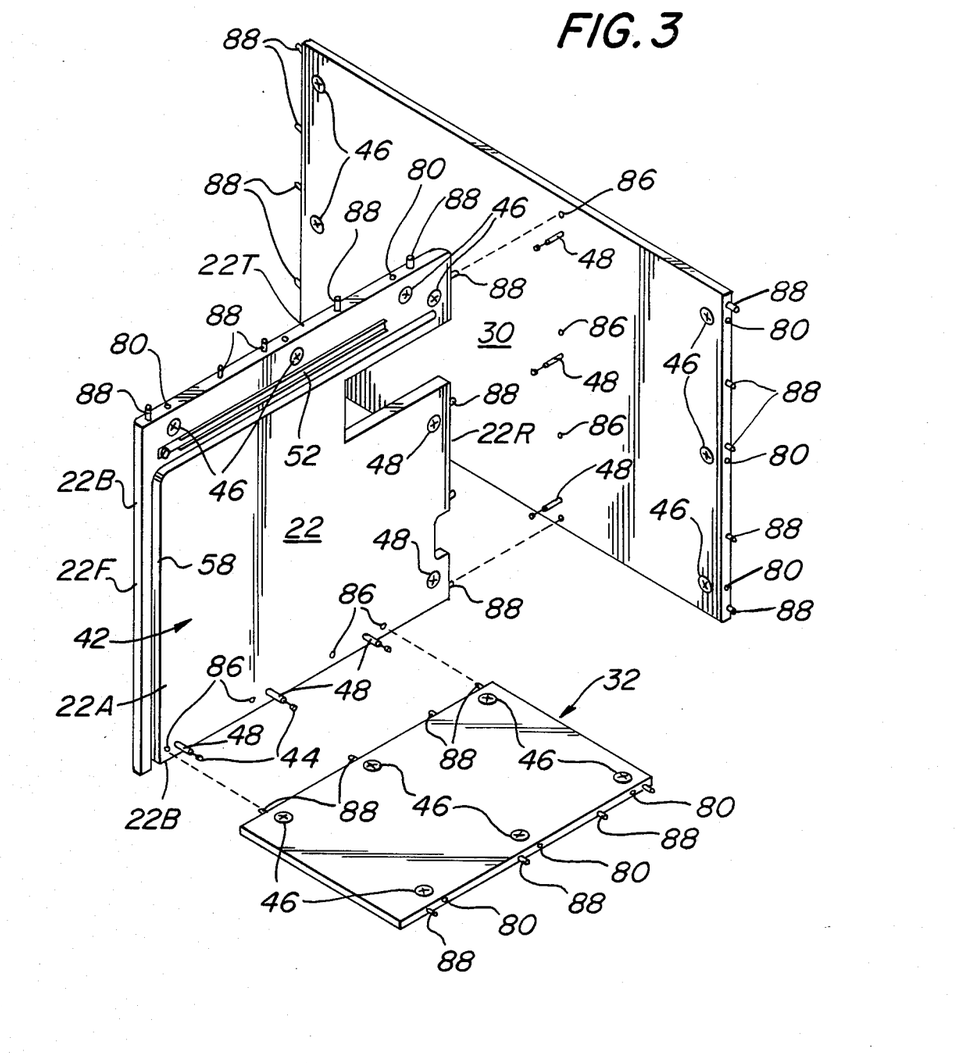
FIG. 3 is an enlarged exploded perspective view of a portion of the embodiment shown in FIG. 2.

As can be seen in FIGS. 1-3 the VDT desk 20 basically comprises a modular support assembly 22 (FIG. 3), plurality of structural panels 24, 26, 28, 30 and 32, a VDT shelf assembly 34, a keyboard drawer 36, a pencil drawer 38, and a sliding door panel 40. The construction of the structural panels 24-32 will be described in detail later. Suffice it for now to state that each is a generally planar, precision-sized member. In commercial embodiments of the invention the panels are preferably formed of an industrial grade of wood particle board, e.g., 45 lb particle board, and are cross cut and finished to size within a +/−0.4 mm tolerance. The panels include a covering of a plastic laminate bonded (e.g., thermofused) to those surfaces which are exposed when the desk is assembled. Moreover, the panels 24-32 are self-edged with the plastic laminate so that all exposed surfaces of the desk are covered with plastic. This feature gives the desk a rich, attractive appearance notwithstanding the fact that it is made up of materials which are relatively inexpensive.

As best seen in FIG. 3 the modular support assembly 22 basically comprises a generally planar support panel 42 and a plurality of pairs of cooperating releasably securable connectors 44. The support panel 42 serves as a basic support element for the desk. To that end selected ones of the structural panels are secured to it. Like the structural panels the support panel is a precisely dimensioned generally planar member, preferably formed of an industrial grade of wood particle board, e.g., 45 lb particle board, and having a covering of a plastic laminate bonded to selected surfaces, e.g., all exposed surfaces, thereof.

The connectors 44 will be described in considerable detail later. Suffice for now to state that each pair of connectors comprises a plug member 46 (FIG. 4) and a cooperating rod-like member 48 which are arranged to be releasably connected together to assemble the desk. In particular the two cooperating members are arranged to be connected to respective panels so that when the two connector members are connected together (as will be described in detail later) their associated panels are rigidly and tightly secured together. Thus, the plug members 46 of selected pairs of connectors 44 are connected to the support panel 42 while the cooperating rod-like members 48 of those selected pairs are connected to those structural panels 24, 30 and 32 which are to be secured to the support panel. Moreover, plug members 46 of other selected pairs of connectors are connected to other structural panels, while rod-like members 48 of those other selected pairs of connectors are connected to still other structural panels to secure those panels to each other.

Referring now to FIGS. 1 and 2 it can be seen that structural panel 24 makes up the top of the desk. The two sides of the desk are formed by the support panels 26 and 28. In particular panel 26 is the right side panel of the desk while panel 28 is its left side panel. Accordingly, both panels 26 and 28 are oriented vertically and parallel to each other. The top edges of the panels 26 and 28 are secured to respective side edges of the top panel by plural pairs of releasably securable connectors 44 and associated molding members (to be described later). The support panel is located between the two side panels and parallel to them. The support panel 42 is oriented vertically and includes a top end surface which is connected to a middle portion of the desk's top panel by three pairs of the releasably securable connectors 44. Thus, the support panel and the side panels serve to support the desk's top panel 24 horizontally above the floor surface 50.

The embodiment of the desk 20 includes a pedestal base to serve as storage or work space. To that end the support panel 22 and the left side panel 26 are connected together at their respective lower ends by the panel 32, now referred to as the bottom or base panel. Thus an interior storage space is defined between the support panel 22, the left side panel 26, the top panel 24 and the base panel 32. The base panel 32 is connected to the support panel 22 and the left side panel 26 via plural pairs of releasably securable connectors 44.

The heretofore identified pencil drawer 38 is located within the top portion of the pedestal's storage space, i.e., just below the top panel. As can be seen clearly in FIG. 2 the pencil drawer 38 is of conventional construction and includes a front wall which is covered in the same laminate as that used on the structural panels. A conventional track 52 is mounted on one side surface 22A of the support panel 22 adjacent its top end surface 22T, while a similar track is mounted on the inside surface of the left side panel 26 adjacent its top end surface 26T. The tracks 52 cooperate with a pair of conventional sliding rail members 54 mounted o respective side walls 56 of the pencil drawer 38 so that the drawer can be slid out of and into the pedestal's storage space.

The heretofore identified door 40 is mounted in the front of the pedestal to provide access to the storage space therein by slidingly covering it. Thus, the side surface 22A of the support panel 22 includes a groove 58 having a portion extending parallel to the top end surface 22T and a portion extending parallel to and close to the front end surface 22F. A similarly shaped groove 58 is located in the inside surface of the side panel 26. The door 40 is a flexible member, e.g., made up of plural horizontally disposed slats which are connected together to enable each to pivot about a horizontal axis with respect to the immediately adjacent slat. The side edges of the door are located within the grooves 58 so that the door can be slid up to expose the interior of the pedestal and to be slid down to close off that interior. When the door is in the up position, i.e., the interior of the pedestal exposed, a substantial portion of the door's side edges are in the top (horizontal) portion of the groove 58.

As mentioned earlier the desk 20 includes the VDT shelf assembly 34. That assembly is shown clearly in FIG. 2 and basically comprises a shelf member 60 and an associated pair of side mounting plates 62. The shelf member is arranged for supporting a computer or video display terminal (not shown) thereon but below the desk's top surface to render that surface clear and usable for other work. The shelf member 60, itself, comprises a base wall 64 extending at a slight upward acute angle to the horizontal, and a rear wall 66 which extends back from the vertical by the same slight acute angle. The mounting plates 62 are fixedly secured by means, not shown, to the sides of the shelf member 60. The shelf assembly 34 is mounted immediately below the desk's top panel 24 and between the right side panel 28 and the support panel 22. The means for mounting the assembly 34 in this position comprise a pair of elongated mounting brackets 68 secured to the inside surface of the left side panel 28 and the side surface 22B of the support panel 22. With the assembly 34 mounted in place a computer monitor or other video display terminal (not shown) which may be disposed on the shelf will be automatically oriented so that its screen is tilted back slightly. Viewing of the screen by the user of the desk 20 is accomplished through a window located in the top panel of the desk. Thus, as can be seen in FIGS. 1 and 2 the top panel 24 includes a rectangular opening 70 having a transparent window 72 located therein. The top surface of the window is flush with the top surface of the desk's top panel.

The heretofore identified keyboard drawer 36 is located just below the top panel of the desk and in front of the VDT shelf assembly 34. The drawer 36 arranged to receive and support therein the keyboard for the computer or video display terminal supported on the assembly 34. The drawer 36 is constructed and mounted similarly to the pencil drawer 3 and thus its construction and mode of mounting will not be reiterated.

Figure 4:
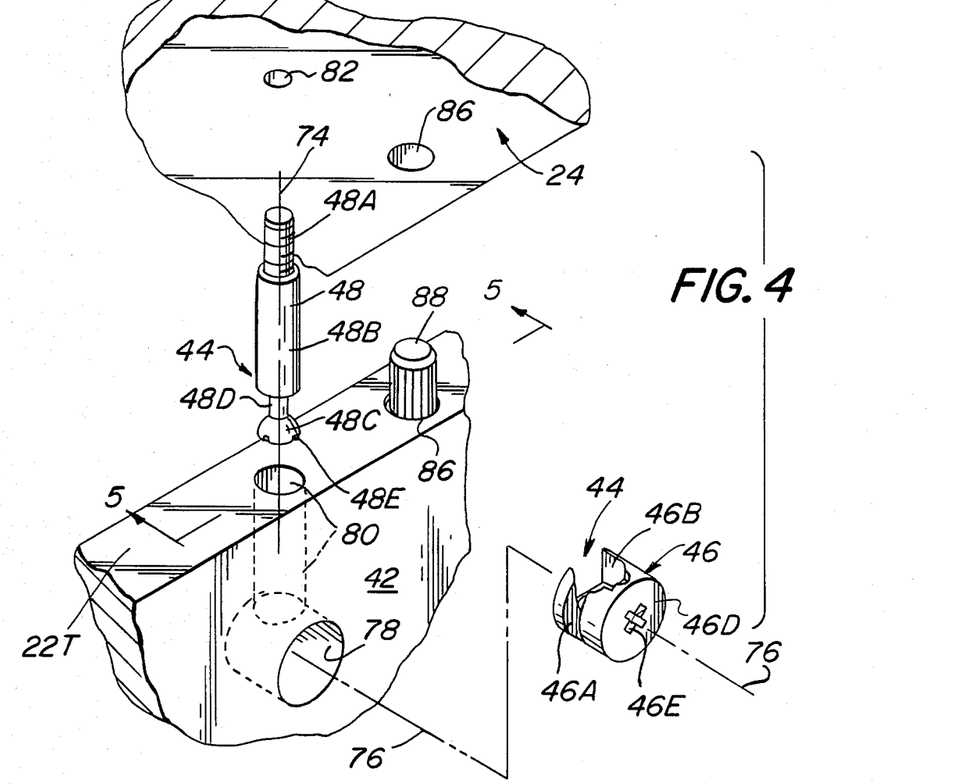
FIG. 4 an enlarged exploded perspective view of a portion of the e shown in FIG. 3.

The details of the construction of the connectors 44 will now be considered with reference to FIGS. 4–9. In accordance with a commercial embodiment of this invention the connectors 44 are conventional readily connectable devices, such as those sold by Hafele American Company, 16926-A South Keegan Avenue, Carson CA 90746, under the trade designation MINI-FIX CAM CONNECTOR. Thus, as can be seen the rod-like member 48 is an elongated, metallic element having longitudinal axis 74, a first end 48A which is externally threaded, a cylindrical intermediate portion 48B, and a second and oppositely disposed end 48C in the form of a bulbous head. The intermediate portion of the member contiguous with the head is necked down at 48 to be of smaller diameter than the head and the remaining intermediate portion. The head includes a cross slot 48E, for receipt of a phillips-type screwdriver to secure the member 48 to the associated panel. The threaded end 48A of the rod-like member serves as the means for securely connecting that member to the associated panel. Thus, for example, as shown in FIG. 4 the threaded end 48A of member 48 is threadedly engaged in a hole 82 in the underside of the top panel 24.

The cooperating plug member 46 is a cylindrical metallic element having a central longitudinal axis 76. A narrow recess or slot 46A is provided in a portion, e.g., 180 degrees, of the periphery of the plug. The width of the recess 46A is just slightly greater than the diameter of the neck portion 48D of a rod-like member 48. However the recess includes an enlarged, cylindrical entrance mouth 46B at one end thereof and extending inward radially to the axis 76. The inside diameter of the entrance 46B is just slightly greater than the diameter of the head 48 of the rod-like member 46. The inner surfaces 48C (see FIGS. 5–7) of plug member forming the recess 46A are cammed, i.e., increase in height from the point immediately adjacent the entrance 46B to the diametrically opposite end of the recess. The end face 46D of the plug member 46 also includes a cross slot 46E for receipt of a phillips-type screw driver.

The rod-like member and the plug member making up each pair of connectors 44 are arranged to be readily connected to each other to effect the securement of the two panels to which they ar connected. This is accomplished by disposing the head of the rod-like member into the entrance to the recess of the plug member and rotating the plug member about its axis to pull the rod-like member closer to it and to lock the head in place. This securement procedure is shown clearly in FIGS. 4–8.

Figure 5:
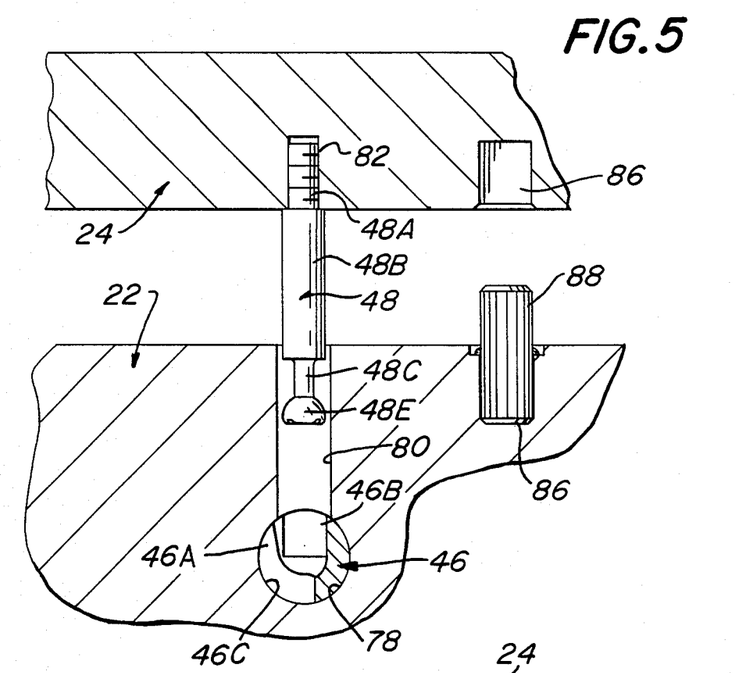
FIG. 5 a sectional view taken along line 5—5 of FIG. 4.
Figure 6:
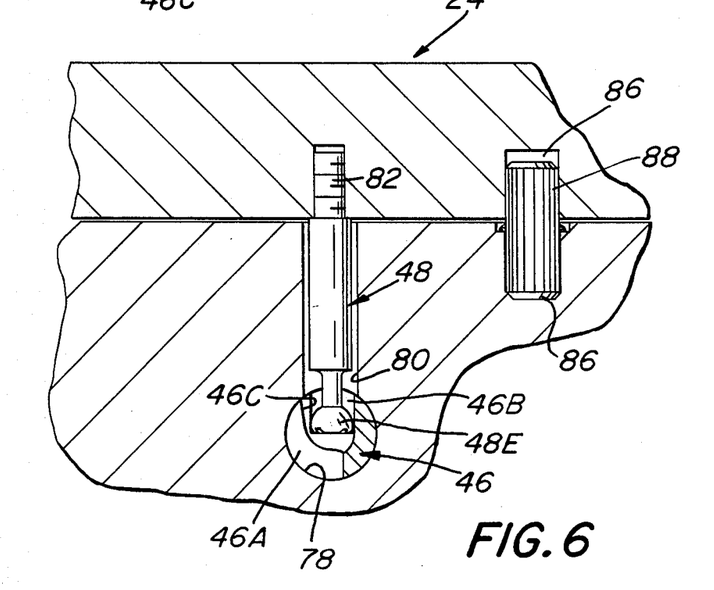
FIG. 6 a view similar to that of FIG. 5 but showing the condition of a portion of the embodiment of the invention of FIG. 1 during the assembly thereof.
Figure 7:
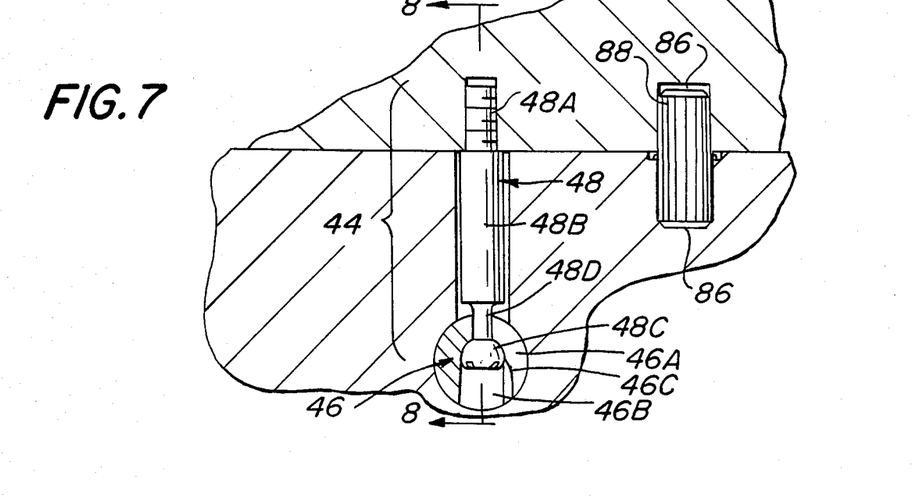
FIG. 7 is a view similar to that of FIG. 5 but showing the condition of a portion of the embodiment of the invention of FIG. 1 after the thereof.

Thus, as shown in FIGS. 4 and 5 the plug member is disposed within a cylindrical bore 78 in the support panel 22, with its central longitudinal axis coincident 76 with the central axis of the bore. The bore 78 is precision drilled to be precisely dimensioned, e.g., 15 mm, to snuggly receive the plug member 46, while still enabling it to be readily rotated about its axis 76. Access of the rod-like member 48 to the bore-mounted plug member 46 is provided by a precision drilled, precisely dimensioned, e.g., 8 mm, cylindrical passageway 80 communicating with the bore 78 and extending in a radial direction with respect to its central axis. For example, as shown in FIG. 4 a passageway 80 extends downward from the top end surface 22T of the support panel 22 and joins the bore 78 radially. The rod-like member is extended into and through the passageway 80 as shown in FIGS. 5 and 6 until its head 48C is located within entrance 46C. At this position (shown in FIG. 6) the top panel is slightly spaced above the top end surface 22T of the support panel. The plug member 46 is then rotated approximately 180 degrees about its longitudinal axis by a screwdriver (not shown), whereupon the head and neck portion of the rod-like member slide down the recess. The cam surfaces of the recess cooperate with the head and neck of the rod-like member to pull that member along its axis 74 toward the central axis 76 of the plug member to the position shown in FIGS. 7 and 8.

As will thus be appreciated by those skilled in the art when the head of the rod-like member in located at the end of the recess opposite to entrance 46B not only are the two panels are rigidly and tightly secured together, but the head of the rodlike member is also locked in the recess of the plug member to preclude accidental loosening of the connection.

If desired, the two panels can be disconnected or disassembled by rotating the plug 180 degrees in the opposite rotational direction so that the head of the rod-like member is again in the recess'entrance (like shown in FIG. 6), whereupon the rod-like member can be withdraw from the plug member.

As can be seen in FIGS. 2 and 3 the rear structural panel 30 is secured to the rear end surface 22R of the support panel by three other pairs of releasably securable connectors 44. The rear panel is also connected to the left and right side panels 28 and 26, respectively, by six other pairs of such connectors. So too, the bottom panel 32 is connected to the support panel 22 and to the right side panel 26 by still six other pairs of such connectors. The connection of the ends of the top panel to the right and left side panels is also effected by the use of still other pairs of connectors 44 as well as the use of respective molding strips 84. Each molding strip is an elongated member having a quarter round upper surface which bears the same plastic laminate as the panels of the desk 20. The rodlike members of six pairs of connectors 44 are threadedly secured, via their portions 48A, in respective openings in the two planar, perpendicularly disposed undersurfaces of the molding strips and are arranged so that their heads engage six associated plug members located in the side panels and top panel, in the same manner as described heretofore to secure the side panels to the top panel.

In order to reinforce the securement of the structural panels of the desk to one another and to the support panel, additional connecting means are provided. Thus, as can be seen clearly in FIGS. 4–7 at abutting panel surfaces there is provided plural pairs of axially aligned, precisely drilled, precision dimensioned, bores 86, with a respective, conventional, e.g., wooden, dowels 88 disposed therein. In a commercial embodiment of the invention the bores are each 8 mm in diameter and the dowels are each 8 mm in diameter.

As should now be appreciated by those skilled in the art the furniture of the subject invention can be manufactured easily and at relatively low cost and is particularly suited for rapid and easy assembly either by the purchaser. Moreover, the completed furniture is as rugged and resistant to accidental disconnection and as good looking as fine, factory assembled furniture. Lastly, when desired the furniture can be readily disassembled, thereby expediting storage and/or transportation.

Without further elaboration, the foregoing will so fully illustrate my invention that others may, by applying current or future knowledge, readily adapt the same for use under various conditions of service.

What is claimed is:

1. A module assembly for furniture which is quick to assemble, said furniture comprising a top panel, said top panel having an upper surface for supporting materials thereon, a lower surface opposed to said upper surface and opposed side end surfaces; said module assembly comprising modular support means, additional panels, a pair of molding strips and releasably securable connector means; said modular support means comprising a support member comprising a support panel having a top end surface; said additional panels including opposed side panels disposed on opposite sides of the support panel and forming the sides of said furniture, each side panel having an outer surface and a top end surface spaced laterally outwardly and below an adjacent side end surface of the top panel; each of said molding strips having an outwardly facing curved surface joined to a pair of planar, substantially perpendicularly disposed undersurfaces, said connector means comprising a plurality of pairs of cooperating members, said cooperating members of each pair being a plug member and a rod-like member, each of said plug members having a recess in a portion of its periphery, said plug members being disposed within cylindrical bores in said support panel, said top panel and said side panels, said cooperating rod-like members being secured to the top panel and to the molding strips through first ends of said cooperating rod-like members, each of said cooperating rod-like members having a second end opposite said first end, said second end having ahead for disposition within a recess of a cooperating plug member, said heads of the rod-like members which are secured to the top panel being disposed within recesses of cooperating plug members disposed within the cylindrical bores in said support panel for aiding in supporting said top panel above a floor surface, and said heads of the rod-like members which are secured to the molding strips being disposed within recesses of cooperating plug members disposed within the cylindrical bores in said top panel and in said side panels, to removably interconnect said molding strips to the top panel and to the side panels in a position wherein the curved surfaces of the molding strips provide a smooth transition from the outer surface of the top panel to the outer surfaces of the side panels, each of said plug members being rotatable in a first direction about an axis extending through the bore in which said plug member is disposed to lock the head of a cooperating rod-like member within said recess and thereby removably secure the top panel to the support panel and the molding strips to both the top panel and the side panels.

2. The assembly of claim 1 wherein said head of each of said rod-like members is of greater width than a contiguous portion thereof, said recess in each of said plug members comprising an entrance of sufficient size for a head of a cooperating rod-like member to extend therethrough and an associated slot whose width is less than the diameter of said head but greater than the width of said contiguous portion of said cooperating rod-like member, whereupon when each of said plug members is rotated in said first direction the head cooperating rod-like member moves from said entrance into said slot to lock said head in place therein.

3. The assembly of claim 2 wherein each of said slots includes at least one cam surface for engaging a portion of the head of a cooperating rod-like member to pull said cooperating rod-like member closer to said plug member when said plug member is rotated in said first direction, to thereby effect the rigid and tight securement of said panels to each other and of the molding strips to said top panel and side panels.

4. The assembly of claim 1 wherein said plug members and said rod-like members are constructed so that upon the rotation of said plug members in said first direction said cooperating rod-like members are pulled closer to said plug members to effect a rigid and tight securement among said panels and said molding strips.

5. The assembly of claim 4 wherein said connecting means additionally comprise a plurality of dowels disposed within associated holes in said panels.

6. The assembly of claim 4 wherein said first ends of said rod-like members are threaded for releasable securement within correspondingly threaded openings in said top panel and said molding strips.

7. The assembly of claim 1 wherein said support panel and side panels comprise precision sized, generally planar members additionally comprising a front end surface, a rear end surface, a bottom end surface and an opposed pair of side surfaces, said support panel and said side panels being formed of wood particle board and having a laminate covering on at least the side surfaces thereof.

8. The assembly of claim 7 wherein said furniture additionally comprises other precision sized panels releasably secured to each other by said connector means, with selected ones of said other panels being formed of wood particle board and having a laminate covering on selected surfaces hereof.

9. The assembly of claim 1 wherein said support panel and at least one side panel disposed laterally of said support panel define a storage space therebetween.

10. The assembly of claim 9 wherein said furniture additionally comprises moveable door means located adjacent said storage space to provide access thereto.

11. The assembly of claim 10 wherein said door means comprises a slideable flexible panel having an opposed pair of marginal edges, said support panel and said at least one side panel each comprising track means to support respective edges of said flexible panel to enable it to slide therealong.

12. The assembly of claim 11 wherein said track means comprises a groove in said support panel and a groove in said side panel.

13. The assembly of claim 9 wherein said additional panels comprise a base panel connected by said connector means between said support panel and said side panel.

14. The assembly of claim 13 additionally comprising slideable drawer means.

15. The assembly of claim 1 wherein said upper surface of said top panel and said outer surfaces of said side panels are provided by a laminate covering a base material, said molding comprising a base material having a laminate covering thereon, said laminate covering being the same as the laminate covering providing the upper surface of the top panel and the outer surfaces of said side panels.

16. The assembly of claim 1 wherein said first ends of said rod-like members are releasably secured within openings in the lower surface of the top panel and within openings in each of the planar, substantially perpendicularly disposed undersurfaces of the molding strips, and further wherein respective passageways extend through said top end surface of said support panel, said top end surfaces of said side panels and said opposed side end surfaces of the top panel for communication with respective bores in which the plug members are received, said passageways removably receiving therethrough the second ends of cooperating rod-like members secured within the openings in the lower surface of the top panel and within the openings in each of the planar, substantially perpendicularly disposed undersurfaces of the molding strips to thereby removably secure the top panel to said support panel and to removably secure the molding strips to said top panel and said side panels.

17. The assembly of claim 16 wherein said support panel has a rear end surface and wherein said furniture additionally comprises a rear panel, said rear panel being oriented in a generally vertical direction overlying and contiguous to said rear end surface of said support panel and being releasably secured to said rear end surface by cooperating members of said connector means.

18. The assembly of claim 17 wherein said rear panel includes opposed side end surfaces, plug members of said connector means being disposed in bores in said rear panel adjacent said opposed side end surfaces, passageways extending inwardly from said opposed side end surfaces and communicating with the plug members disposed within the bores adjacent said opposed side end surfaces, cooperating rod-like members being secured at the first ends thereof to each of the opposed side panels and with the second ends thereof removably received within corresponding passageways extending inwardly from said opposed side end surfaces of the rear panel for removably securing said opposed side panels to said rear panel.

19. The assembly of claim 18 wherein said support panel includes bores adjacent the rear end surface thereof, plug members of said connector means being disposed in the bores adjacent the rear end surface, passageways extending inwardly from said rear end surface and communicating with the plug members disposed within the bores adjacent said rear end surface, cooperating rod-like members being secured at the first ends thereof to the rear panel and with the second ends thereof removably received within corresponding passageways extending inwardly from said rear end surface of the support panel for removably securing said rear panel directly to said support panel.

20. The assembly of claim 9 wherein the bores in said side panels extend only partially through the thickness thereof from inner surfaces of said side panels, and wherein the bores in the top panel extend only partially through the thickness thereof from the lower surface of said top panel, whereby in the assembled furniture the plugs rotatably disposed within the bores of the side panels and the top panel are not exposed to view through outer surfaces of said side panels and top panel.

21. The assembly of claim 1 wherein said support panel has a rear end surface and wherein said furniture additionally comprises a rear panel, said rear panel being oriented in a generally vertical direction overlying and contiguous to said rear end surface of said support panel and being releasably secured to said rear end surface by cooperating members of said connector means.

22. The assembly of claim 21 wherein said rear panel includes opposed side end surfaces, plug members of said connector means being disposed in bores in said rear panel adjacent said opposed side end surfaces, passageways extending inwardly from said opposed side end surfaces and communicating with the plug members disposed within the bores adjacent said opposed side end surfaces, cooperating rod-like members being secured at the first ends thereof to each of the opposed side panels and with the second ends thereof removably received within corresponding passageways extending inwardly from said opposed side end surfaces of the rear panel for removably securing said opposed side panel to said rear panel.

23. The assembly of claim 22 wherein said support panel includes bores adjacent the rear end surface thereof, plug members of said connector means being disposed in the bores adjacent the rear end surface, passageways extending inwardly from said rear end surface and communicating with the plug members disposed within the bores adjacent said rear end surface, cooperating rod-like members being secured at the first ends thereof to the rear panel and with the second ends thereof removably received within corresponding passageways extending inwardly from said rear end surface of the support panel for removably securing said rear panel directly to said support panel.

24. The assembly of claim 23 wherein the bores in said side panels extend only partially through the thickness thereof from inner surfaces of said side panels, and wherein the bores in the top panel extend only partially through the thickness thereof from the lower surface of said top panel, whereby in the assembled furniture the plugs rotatably disposed with the bores of the side panels and the top panel are not exposed to view through outer surfaces of said side panels and top panel.

* * * * *